(12) United States Patent
Satou et al.

(10) Patent No.: US 11,091,669 B2
(45) Date of Patent: Aug. 17, 2021

(54) COATING MATERIAL FOR COATED METAL PLATE

(71) Applicant: NIPPON STEEL NISSHIN CO., LTD., Tokyo (JP)

(72) Inventors: Masaki Satou, Chiba (JP); Seiju Suzuki, Chiba (JP); Shuichi Sugita, Chiba (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

(21) Appl. No.: 16/494,830

(22) PCT Filed: Apr. 13, 2017

(86) PCT No.: PCT/JP2017/015055
§ 371 (c)(1),
(2) Date: Sep. 17, 2019

(87) PCT Pub. No.: WO2018/179453
PCT Pub. Date: Oct. 4, 2018

(65) Prior Publication Data
US 2020/0087537 A1    Mar. 19, 2020

(30) Foreign Application Priority Data

Mar. 29, 2017 (JP) .............................. JP2017-065925

(51) Int. Cl.
*C09D 183/06* (2006.01)
*C08G 77/18* (2006.01)
*C08G 77/00* (2006.01)

(52) U.S. Cl.
CPC ........... *C09D 183/06* (2013.01); *C08G 77/18* (2013.01); *C08G 77/80* (2013.01)

(58) Field of Classification Search
CPC combination set(s) only.
See application file for complete search history.

(56) References Cited

U.S. PATENT DOCUMENTS

| | | | |
|---|---|---|---|
| 5,498,666 A | 3/1996 | Toshiro et al. | |
| 5,635,572 A | 6/1997 | Kazuhiko et al. | |
| 6,147,156 A | 11/2000 | Masaaki et al. | |
| 7,756,384 B2 * | 7/2010 | Fu | C09D 183/04 257/E21.262 |
| 9,150,727 B2 * | 10/2015 | Horstman | C08L 83/10 |
| 2016/0032147 A1 * | 2/2016 | Maghsoodi | C09D 7/61 438/29 |
| 2018/0371172 A1 * | 12/2018 | Fu | C08G 77/06 |
| 2020/0024476 A1 * | 1/2020 | Satou | B32B 15/08 |

FOREIGN PATENT DOCUMENTS

| | | |
|---|---|---|
| EP | 656409 | 6/1995 |
| EP | 863191 | 9/1998 |
| JP | H03200884 | 9/1991 |
| JP | H0559330 | 3/1993 |
| JP | H0790226 | 4/1995 |
| JP | H07150105 | 6/1995 |
| JP | H11255846 | 9/1999 |
| JP | 2000061391 | 2/2000 |
| JP | 2001220543 | 8/2001 |
| JP | 2002307606 | 10/2002 |
| JP | 2003105265 | 4/2003 |
| JP | 2003292887 | 10/2003 |
| JP | 2006102671 | 4/2006 |
| WO | 94/06870 | 3/1994 |
| WO | 2014/069296 | 5/2014 |

OTHER PUBLICATIONS

Machine translation of WO 2014/069296 (Aug. 2014).*
Office action from Japanese Application No. 2017-065925 dated Nov. 9, 2018.
Office action from Japanese Application No. 2017-065925 dated Oct. 30, 2018.
International Search Report and Written Opinion from PCT/JP2017/015055 dated 18 Jul. 18, 2017 (English translation of International Search Report included).
IPRP from PCT-JP-2017/015055 dated Dec. 4, 2017 (in Chinese only).
Communication from European Application No. 17903016.8 dated Feb. 20, 2020.

* cited by examiner

*Primary Examiner* — Marc S Zimmer
(74) *Attorney, Agent, or Firm* — Calfee, Halter & Griswold LLP

(57) ABSTRACT

The purpose of the present invention is to provide a coating material that is for a coated metal plate, that has high storage stability, that is less likely to contaminate a heating device, and that can be used to produce a coated metal plate having a surface on which rain streaks are less likely to occur and having high scratch resistance. The coating material contains a silicone resin including 5-50 mol % of a silanol group with respect to the total number of moles of Si atoms.

2 Claims, 2 Drawing Sheets

COATING MATERIAL FOR COATED METAL PLATE

RELATED APPLICATIONS

The present application is a 35 U.S.C. 371 U.S. national stage application entry of PCT International Application No. PCT/JP2017/015055, filed on Apr. 13, 2017, which claims the benefit of Japanese Patent Application No. 2017-065925, filed on Mar. 29, 2017, the entire disclosures of which are incorporated herein by reference.

TECHNICAL FIELD

The present invention relates to a coating material for a coated metal sheet.

BACKGROUND ART

Coated metal sheets are frequently used in outdoor constructions, civil engineering structures and the like. Such coated metal sheets suffer stains due to adherence of carbon-based pollutional material (hereinafter also referred to as "hydrophobic carbon") contained in exhaust from automobiles, industrial smoke and the like. Among stains, stains adhering along rain streaks (hereinafter also referred to as "rain-streak stain") are particularly noticeable. Such a rain-streak stain always noticeably appears within a relatively short time on a conventional coated metal sheet, and therefore there is a demand for a coated metal sheet on which a rain-streak stain is not easily generated.

In recent years, it has been proposed to prevent a rain-streak stain by employing a coating film having a water contact angle of 60° or less, namely a hydrophilic coating film. On the surface of a hydrophilic coating film having a low water contact angle, it is believed that hydrophobic carbon is more likely to leave the surface with rainwater and thus washed away. One example of an approach for hydrophilizing the surface of a coated metal sheet is a method in which a coating material containing tetraalkoxysilane or a condensate thereof (hereinafter also referred to as "organosilicate") is applied on the surface of a metal sheet (PTL 1). Another method has also been proposed, in which a coating material containing a vinyl group-containing polysiloxane resin or the like is applied to a metal sheet and the coating film is subjected to a corona discharge treatment (PTL 2). Furthermore, a method has also been proposed in which a coating material containing a polyester resin is applied to a metal sheet and the coating film is subjected to a corona discharge treatment at 200 W/m$^2$/min or more (PTL 3). Furthermore, a method has also been proposed in which a coating material containing organosilicate or the like is applied to a metal sheet and the coating film is subjected to a flame treatment, plasma treatment or corona discharge treatment (PTL 4).

CITATION LIST

Patent Literature

PTL 1
WO1994/6870
PTL 2
Japanese Patent Application Laid-Open No. H05-59330
PTL 3
Japanese Patent Application Laid-Open No. 2000-61391
PTL 4
Japanese Patent Application Laid-Open No. 2006-102671

SUMMARY OF INVENTION

Technical Problem

Above-described PTL 1 describes applying a coating material containing organosilicate such as methyl silicate or ethyl silicate to the surface of a metal sheet. When the coating material is applied to the surface of the metal sheet, organosilicate moves to the surface side. Then, on the surface of the cured film (coating film) of the coating material, organosilicate reacts with moisture or the like in the air to produce silanol groups or siloxane bonds on the surface of the coating film. As a result of this, it is believed that the surface of the coating film is hydrophilized.

However, methyl silicate has high compatibility with a resin or the like contained in the coating material. Therefore, when the coating is applied, it is hard for methyl silicate to move to the surface side. Accordingly, hydrophilicity of the surface of the coating film is unlikely to be enhanced sufficiently. In this case, hardness of the surface of the coating film is also unlikely to be enhanced sufficiently. On the other hand, ethyl silicate has low compatibility with a resin or the like contained in the coating material. Therefore, when the coating material is applied to the surface of the metal sheet, ethyl silicate tends to move to the surface side. However, ethyl silicate is unlikely to be hydrolyzed on the surface of the coating film and it takes time to hydrophilize the surface of the coating film. Accordingly, rain-streak stains are generated before the coating film is sufficiently hydrophilized.

That is, it has been difficult for either organosilicate to sufficiently suppress occurrence of rain-streak stains.

Furthermore, when a coating material contains the organosilicate described above (methyl silicate or ethyl silicate), there has been a problem in that, upon curing the coating material, organosilicate tends to be evaporated along with a solvent and to foul a heating apparatus.

Meanwhile, it has been difficult for techniques described in above-mentioned PTLS 2 to 4 to sufficiently prevent rain-streak stains. For example, in the technique described in PTL 2, after applying a coating material containing a polysiloxane resin to the surface of a metal sheet, a corona discharge treatment is carried out. However, it is difficult to uniformly hydrophilize the surface of the coating film only by carrying out the corona discharge treatment on the coating film of that coating material. When coating films containing polysiloxane resin are subjected to a corona discharge treatment, hydrophilic areas and hydrophobic areas are formed on the surface of coating films. Then, hydrophobic carbon adheres strongly to hydrophobic areas. On the other hand, in hydrophilic areas, hydrophobic carbon leaves the surface with rainwater. However, the hydrophobic carbon leaving the surface is attracted to hydrophobic carbon adhering to hydrophobic areas, and hydrophobic carbon is gradually deposited around hydrophobic areas as base points. Therefore, it has been difficult to obtain a coated metal sheet having high rain-streak stain resistance through the technique described in PTL 2.

In addition, in PTL 3, a corona discharge treatment is carried out on the surface of a coating film of a coating material containing a polyester resin and the like, but in this case as well, hydrophobic areas and hydrophilic areas are formed, and thus, it has been difficult to uniformly hydrophilize the surface of the coating film. Furthermore, in PTL 4, a coating film of a coating material containing ethyl silicate is subjected to a flame treatment, plasma treatment or corona discharge treatment. As mentioned above, in a coating material containing ethyl silicate, ethyl silicate tends to be evaporated along with a solvent upon heating and drying a film composed of the coating material, and fouling of a heating apparatus tends to occur.

Moreover, organosilicate contained in the coating material described in PTL 1 or PTL 4 is highly reactive with water. Therefore, it is likely to be hydrolyzed by moisture in the coating material, and there has also been a problem in that storage stability of the coating material is low.

The present invention has been completed in view of the above circumstances. That is, an object of the present invention is to provide a coating material that has high storage stability and rarely fouls a heating apparatus, and furthermore, by which a coated metal sheet in which rain-streak stains are unlikely to occur and the scratch resistance is high can be made.

Solution to Problem

The present invention relates to the following coating material for a coated metal sheet.
[1] A coating material for a coated metal sheet, comprising a silicone resin, the silicone resin containing silanol groups in an amount of 5 to 50 mol % relative to the total number of moles of Si atoms.
[2] The coating material for a coated metal sheet according to [1], wherein the silicone resin contains Si atoms derived from trialkoxysilane in an amount of 50 to 100 mol % relative to the total number of moles of Si atoms.
[3] The coating material for a coated metal sheet according to [1] or [2], wherein a proportion of a number of moles of aryl groups directly bonded to Si atoms to a number of moles of alkyl groups directly bonded to Si atoms is 20 to 80% in the silicone resin.
[4] The coating material for a coated metal sheet according to any one of [1] to [3], wherein the coating material further contains a polyester resin or an acrylic resin.

Advantageous Effects of Invention

The coating material for a coated metal sheet according to the present invention has high storage stability and furthermore, rarely fouls a heating apparatus. In addition, according to the coating material for a coated metal sheet, it is further possible to make a coated metal sheet in which rain-streak stains are unlikely to occur on the surface and the scratch resistance is high as well.

DESCRIPTION OF EMBODIMENTS

1. Coating Material

Figure 1A:
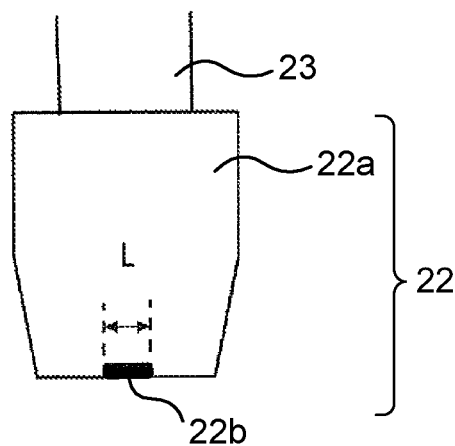
FIG. 1A is a side view of a burner head of a burner for flame treatment.

The coating material for a coated metal sheet according to the present invention is applied to the surface of a metal sheet for use. Note that, after applying the coating material to the surface of a metal sheet, the surface of a coating film composed of the coating material is subjected to a hydrophilization treatment through a flame treatment.

As mentioned above, it has been conventionally attempted to prevent rain-streak stains that occur on a coated metal sheet by applying a coating material containing organosilicate on the surface of a metal sheet. When applied to the surface of the metal sheet, organosilicate moves to the surface side. It is believed that this organosilicate is then hydrolyzed to produce silanol groups or siloxane bonds, thereby expressing rain-streak stain resistance. However, organosilicate tends to be evaporated along with a solvent upon heating and drying the coating material. Therefore, there has been a problem in that, upon using a coating material containing organosilicate, a heating apparatus tends to be fouled. In addition, organosilicate is highly reactive and is readily hydrolyzed by moisture in the coating material to be polymerized. Accordingly, there has also been a problem in that a coating material containing them has low storage stability.

In contrast, a coating material according to the present invention contains a particular silicone resin. Here, the "silicone resin" in the present specification refers to a compound in which alkoxysilane is partially hydrolyzed and condensed. This compound mainly has a three dimensional crosslinked structure but does not reach the state of gel, and is a polymer that is soluble in an organic solvent. The three dimensional crosslinked structure that the silicone resin includes is not particularly limited, and for example, it may be any of cage-shaped, ladder-shaped or random shaped. Note that, in the present specification, the silicone resin does not include tetraalkoxysilane or a condensate formed by hydrolyzing and condensing tetraalkoxysilane only (organosilicate).

Since the silicone resin includes a three dimensional crosslinked structure, when the coating material is applied to the surface of the metal sheet, the silicone resin tends to be transferred to the surface side of the film and further arranged uniformly along the surface of the film. When such a coating film is subjected to a flame treatment, organic groups (such as methyl groups or phenyl groups) that the silicone resin contains are removed evenly, and silanol groups or siloxane bonds are introduced to the surface of the coating film. As a result, hydrophilicity of the surface of the coated metal sheet is uniformly increased, providing very satisfactory rain-streak stain resistance. In addition, since the silicone resin is arranged uniformly on the surface of the coating film, scratch resistance of the coating film is also satisfactory.

Moreover, the silicone resin contained in the coating material according to the present invention contains silanol groups in an amount of 5 to 50 mol % relative to the total number of moles of Si atoms in the silicone resin. The silicone resin in which the amount of silanol groups is 5 to 50 mol % relative to the total number of moles of Si atoms has appropriate reactivity and is unlikely to be excessively condensed due to moisture contained in the coating material. Therefore, the silicone resin is unlikely to react in the coating material, thereby providing the coating material with very satisfactory storage stability. In addition, since silanol groups are appropriately bonded to other components in the coating material via hydrogen bonding, after application of the coating material, the silicone resin is unlikely to be evaporated upon heating and drying the film. Accordingly, the coating material according to the present invention is not likely to foul a heating apparatus.

Here, the coating material according to the present invention is only required to contain the above-described silicone resin, but the coating material may further contain a resin, various additives or the like. In the following, each component contained in the coating material according to the present invention will be described in detail.

(1) Silicone Resin

As mentioned above, the silicone resin is a compound in which alkoxysilane is partially hydrolyzed and condensed, and in its molecular chain, any one or two or more of T-1 unit to T-3 unit, represented by the following general formulas, derived from trialkoxysilane (all of which are also collectively referred to as "T units") are normally included.

[Formula 1]

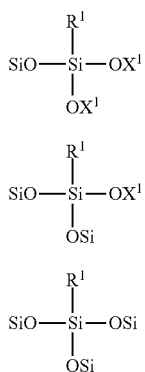

(T-1 unit)

(T-2 unit)

(T-3 unit)

In the general formulas described above, $R^1$ represents a hydrocarbon group that optionally has a substituent. In addition, $X^1$ represents a hydrogen atom or a hydrocarbon group. In the silicone resin, multiple types of T units with different types of above-described $R^1$ and $X^1$ may be included.

$R^1$ is preferably a hydrocarbon group having 1 to 12 carbon atoms, and specific examples thereof include alkyl groups such as methyl group, ethyl group, propyl group, hexyl group and octyl group; aryl groups such as phenyl group, tolyl group, xylyl group and naphthyl group; cycloalkyl groups such as cyclohexyl group, cyclobutyl group and cyclopentyl group; and the like. Among them, methyl group and phenyl group are particularly preferred.

Meanwhile, $X^1$ is preferably a hydrogen atom or a hydrocarbon group having 1 to 8 carbon atoms, and examples of the hydrocarbon group include alkyl groups such as methyl group, ethyl group, propyl group and hexyl group; aryl groups such as phenyl group, tolyl group and xylyl group; cycloalkyl groups such as cyclohexyl group, cyclobutyl group and cyclopentyl group; and the like. Among them, methyl group and ethyl group are particularly preferred.

In addition, in the molecular chain of the silicone resin, either one or both of D-1 unit and D-2 unit, represented by the following general formulas, derived from dialkoxysilane (all of which are also collectively referred to as "D units") may be included.

[Formula 2]

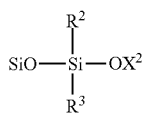

(D-1 unit)

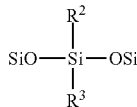

(D-2 unit)

In the general formulas described above, $R^2$ and $R^3$ each independently represent a hydrocarbon group that optionally has a substituent. In addition, $X^2$ represents a hydrogen atom or a hydrocarbon group. Note that, in the silicone resin, multiple types of D units with different types of above-described $R^2$, $R^3$ and $X^2$ may be included.

Each of $R^2$ and $R^3$ is preferably a hydrocarbon group having 1 to 12 carbon atoms, and specific examples thereof include the same groups as above-mentioned $R^1$ for T units. Meanwhile, $X^2$ is preferably a hydrogen atom or a hydrocarbon group having 1 to 8 carbon atoms, and specific examples thereof include the same groups as above-mentioned $X^1$ for T units.

Furthermore, in the molecular chain of the silicone resin, any one or two or more of Q-1 unit to Q-4 unit, represented by the following general formulas, derived from tetraalkoxysilane (all of which are also collectively referred to as "Q units") may be included.

[Formula 3]

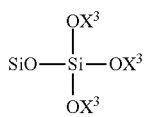

(Q-1 unit)

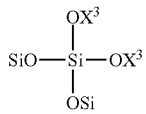

(Q-2 unit)

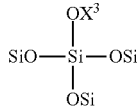

(Q-3 unit)

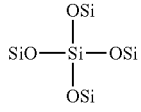

(Q-4 unit)

In the general formulas described above, $X^3$ represents a hydrogen atom or a hydrocarbon group. Note that, in the silicone resin, multiple types of Q units with different types of above-described $X^3$ may be included.

$X^3$ is preferably a hydrogen atom or a hydrocarbon group having 1 to 8 carbon atoms, and specific examples thereof include the same groups as above-mentioned $X^1$ for T units.

The silicone resin has a structure in which the above-described T units, D units and/or Q units are bonded in a three dimensional manner. As mentioned above, the amount (number of moles) of silanol groups in the silicone resin contained in the coating material according to the present invention is 5 to 50 mol % and more preferably 15 to 40 mol % relative to the total number of moles of Si atoms. When the amount of silanol groups is greater than 50 mol % relative to the total number of moles of Si atoms, the reactivity of the silicone resin tends to be increased and the storage stability of the coating material tends to be lowered. On the other hand, when the amount of silanol groups is less than 5 mol % relative to the total number of moles of Si atoms, the silicone resin is unlikely to be bonded to other components in the coating material (such as an epoxy resin) via hydrogen bonding, and the silicone resin is likely to be evaporated upon curing the coating material. Furthermore, when the amount of silanol groups is less than 5 mol %, the silicone resin is unlikely to be sufficiently crosslinked upon curing the coating material, and the scratch resistance of the coating film may not be enhanced sufficiently.

In contrast, when the amount of silanol groups in the silicone resin is in the range described above, not only the storage stability of the coating material is enhanced, but also the silicone resin is unlikely to be evaporated upon curing the film composed of the coating material, as mentioned above. Furthermore, the scratch resistance of the coating film composed of the coating material becomes satisfactory.

The number of moles of Si contained in the silicone resin and the amount of silanol groups contained in the silicone resin can be specified through analysis with $^{29}$Si-NMR and analysis with $^{1}$H-NMR. In addition, the amount of silanol groups in the silicone resin can be adjusted through the charging ratio of T units, D units and Q units, or the degree of condensation reaction. For example, when trialkoxysilane is used to prepare a silicone resin, by prolonging the duration for condensation reaction or the like, the amount of T-3 unit is increased and the amount of silanol groups is decreased.

Moreover, the silicone resin contains Si atoms derived from trialkoxysilane, that is, Si atoms constituting T units preferably in an amount of 50 to 100 mol % and more preferably in an amount of 60 to 100 mol % relative to the total number of moles of Si atoms that the silicone resin contains. When the amount of T units is less than 50 mol % (in particular, when the amount of D units is greater than 50 mol %), the silicone resin tends to form a micelle structure and the silicone resin is likely to be enriched in the form of sea-island on the surface of the coating film. As a result, it is hard to uniformly enhance hydrophilicity or hardness of the surface of the coating film, and unevenness in scratch resistance or rain-streak stain resistance of the coating film is likely to occur. Note that whether the silicone resin is enriched in the form of sea-island on the surface of the coating film or not can be confirmed by analyzing the surface of the coating film after the flame treatment with an AFM (atomic force microscope). For example, the etching depth through the flame treatment in the sea part is different from that in the island part on the surface of the coating film. Accordingly, the sea-island distribution of the silicone resin can be confirmed through irregularities on the surface of the coating film.

In contrast, when the amount of T units is 50 mol % or more, the silicone resin is unlikely to form a micelle structure and the silicone resin is likely to be enriched uniformly on the surface of the coating film. As a result, the rain-streak stain resistance of a coated metal sheet to be obtained by applying the coating material becomes satisfactory, or scratch resistance of the coating film becomes satisfactory. The amount of Si atoms constituting T units can be specified through analysis with $^{29}$Si-NMR.

In addition, the proportion of the number of moles of aryl groups directly bonded to Si atoms of the silicone resin based on the number of moles of alkyl groups directly bonded to Si atoms of the silicone resin, that is, the proportion of aryl groups/alkyl groups is preferably 20 to 80% and more preferably 30 to 70%. When the molar ratio of aryl groups is increased, the silicone resin is more likely to be dissolved in other components in the coating material. However, when the proportion of aryl groups becomes excessive, the reaction speed upon formation of the coating film is decreased significantly, and it may be hard to obtain a sufficient crosslinking density. The above-described ratio of alkyl groups and aryl groups can be specified through analysis with $^{1}$H-NMR.

Here, the weight average molecular weight of the silicone resin is preferably 700 to 50,000 and more preferably 1,000 to 10,000. When the weight average molecular weight of the silicone resin is less than 700, the silicone resin is likely to be evaporated upon curing the coating material (film), and therefore, the heating apparatus may be fouled or the amount of the silicone resin on the surface of the coating film to be obtained may become small. On the other hand, when the weight average molecular weight is greater than 50,000, the viscosity of the coating material is likely to be increased and the storage stability is lowered. Note that the above-described weight average molecular weight of the silicone resin is in terms of polystyrene, measured by gel permeation chromatography (GPC).

The coating material contains the silicone resin preferably in an amount of 1 to 10 parts by mass, and more preferably in an amount of 2 to 6 parts by mass relative to 100 parts by mass of the solid content of the coating material. When the coating material contains the silicone resin in an amount within the range described above, hydrophilicity of the surface of a coating film to be obtained can be enhanced sufficiently and rain-streak stains are unlikely to occur. In addition, hardness of the surface of the coating film is also increased.

The silicone resin mentioned above can be prepared through hydrolytic polymerization of trialkoxysilane or the like. Specifically, alkoxysilane such as trialkoxysilane or a partial condensate thereof is dispersed in water or a solvent such as an alcohol. Then, the pH of that dispersion is preferably adjusted to 1 to 7, and more preferably to 2 to 6, and alkoxysilane or the like is hydrolyzed. Subsequently, the hydrolysate is subjected to dehydrative condensation on its own to obtain a silicone resin. The molecular weight or the like of a silicone resin to be obtained can be adjusted through the duration of dehydrative condensation or the like. The condensation of the hydrolysate can be carried out in succession with the above-described hydrolysis, and the condensation reaction can be accelerated by evaporating an alcohol produced through the hydrolysis or water.

Note that alkoxysilane used for preparation of the silicone resin is appropriately selected depending on a desired structure of the silicone resin. Examples of the trialkoxysilane compound include methyltrimethoxysilane, methyltriethoxysilane, methyltriisopropoxysilane, methyltributoxysilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, hexyltrimethoxysilane, decyltrimethoxysilane, octadecyltrimethoxysilane, phenyltrimethoxysilane, phenyltriethoxysilane, methyltrisilanol, phenyltrisilanol and the like.

Examples of dialkoxysilane include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, diphenyldimethoxysilane and the like.

Furthermore, examples of tetraalkoxysilane include tetramethoxysilane, tetraethoxysilane, tetraisopropoxysilane, tetrabutoxysilane, tetramethoxysilane and the like.

Upon preparation of the silicone resin, partial condensates of the above-described trialkoxysilane, dialkoxysilane and tetramethoxysilane may be used as a raw material.

(2) Resin

As mentioned above, the coating material may contain a resin. Here, the resin refers to a component to become a binder for a coating film that is obtained by application of the coating material. Examples of the resin include polymeric compounds such as polyester resins, polyester urethane resins, amino-polyester resins, acrylic resins, acrylic urethane resins, amino-acrylic resins, poly(vinylidene fluoride) resins, polyurethane resins, epoxy resins, polyvinyl alcohol resins, phenol resins and fluororesins. Among them, polyester resins, polyester urethane resins, amino-polyester resins, acrylic resins, acrylic urethane resins, amino-acrylic resins and poly(vinylidene fluoride) resins are preferred for their high resistance to stain adhesion. In particular, polyester resins and acrylic resins are preferred for their high weather resistance. In some embodiments, the binder resin comprises a polyester resin or an acrylic resin not having a silyl group.

The polyester resin may be any resin known in the art prepared by the polycondensation of a polyvalent carboxylic acid and a polyhydric alcohol. Examples of the polyvalent carboxylic acid include aromatic dicarboxylic acids such as terephthalic acid, isophthalic acid, phthalic acid, 2,6-naphthalenedicarboxylic acid and 2,7-naphthalenedicarboxylic acid, and anhydrides thereof; aliphatic dicarboxylic acids such as succinic acid, adipic acid, azelaic acid, sebacic acid, dodecanedicarboxylic acid and 1,4-cyclohexanedicarboxylic acid, and anhydrides thereof; lactones such as γ-butyrolactone and ε-caprolactone; polyvalent carboxylic acids having a valency of 3 or more such as trimellitic acid, trimesic acid and pyromellitic acid; and the like. The polyester resin may include only one structure or two or more structures derived from the polyvalent carboxylic acid described above.

Examples of the polyhydric alcohol include glycols such as ethylene glycol, 1,2-propanediol, 1,3-propanediol, 1,2-butanediol, 1,3-butanediol, 1,4-butanediol, 1,2-pentanediol, 1,4-pentanediol, 1,5-pentanediol, 2,3-pentanediol, 1,4-hexanediol, 2,5-hexanediol, 1,5-hexanediol, 3-methyl-1,5-pentanediol, diethylene glycol, triethylene glycol, 1,2-dodecanediol, 1,2-octadecanediol, neopentyl glycol, 1,4-cyclohexanediol, 1,4-cyclohexanedimethanol, bisphenol A alkylene oxide adducts and bisphenol S alkylene oxide adducts; polyhydric alcohols having a valency of 3 or more such as trimethylolpropane, glycerin and pentaerythritol; and the like. The polyester resin may include only one structure or two or more structures derived from the polyhydric alcohol described above.

When the resin described above is a polyester resin, the number average molecular weight thereof (in terms of polystyrene) measured by GPC is preferably 2,000 to 8,000. When the number average molecular weight is less than 2,000, the processability of the coated metal sheet may be reduced, thereby possibly generating cracks of the coating film. In addition, when the number average molecular weight is greater than 8,000, the crosslinking density of the obtained coating film is reduced. Therefore, the weather resistance of the coating film may be reduced. In view of the balance between processability and weather resistance, the number average molecular weight is particularly preferably 3,000 to 6,000.

On the other hand, the acrylic resin may be any resin that contains a (meth)acrylate ester as a monomer component, and may contain other monomer components as a part thereof in addition to the (meth)acrylate ester. In the present specification, (meth)acrylate refers to acrylate or methacrylate. Examples of the monomer component constituting the acrylic resin include (meth)acrylate esters and cycloalkyl (meth)acrylate esters having an ester group having 1 to 18 carbon atoms such as methyl (meth)acrylate, ethyl (meth)acrylate, n-propyl (meth)acrylate, isopropyl (meth)acrylate, n-, i- or t-butyl (meth)acrylate, hexyl (meth)acrylate, 2-ethylhexyl (meth)acrylate, n-octyl (meth)acrylate, decyl (meth)acrylate, laulyl (meth)acrylate and cyclohexyl (meth)acrylate; (meth)acrylic hydroxy esters having a hydroxyalkyl ester group having 2 to 8 carbon atoms such as 2-hydroxyethyl (meth)acrylate, 2-hydroxypropyl (meth)acrylate, 3-hydroxypropyl (meth)acrylate and hydroxybutyl (meth)acrylate; N-substituted (meth)acrylamide monomers such as N-methylol (meth)acrylamide, N-butoxymethyl (meth)acrylamide and N-methoxymethyl (meth)acrylamide; aromatic vinyl monomers such as styrene, vinyltoluene, 2-methyl styrene, t-butylstyrene and chlorostyrene; (meth)acrylic acid; glycidyl (meth)acrylate; and the like. The acrylic resin may include only one of these monomer components or two or more of them.

When the resin described above is an acrylic resin, the number average molecular weight thereof (in terms of polystyrene) measured by GPC is not particularly limited, but from the viewpoint of obtaining a coating film excellent in hardness and weather resistance, the number average molecular weight is preferably 1,000 to 200,000, more preferably 5,000 to 100,000, and further preferably 10,000 to 50,000.

The amount of the resin contained in the coating material is appropriately selected depending on an application of the coating material or the type of the resin. From the viewpoint of the strength of a coating film to be obtained, the coating material contains the resin described above preferably in an amount of 25 to 60 parts by mass and more preferably in an amount of 30 to 50 parts by mass relative to 100 parts by mass of the solid content of the coating material.

On the other hand, the coating material may contain a curing agent. The curing agent is a component for adjusting the nature, physical properties (for example, the surface hardness and durability of the coating film) and the like of the coating film, and one example of the curing agent is a compound capable of crosslinking the resin described above. The curing agent is appropriately selected depending on the type of the resin. For example, when the resin described above is a polyester resin, the curing agent is preferably a melamine curing agent. Examples of the melamine curing agent include methylated melamine resin curing agents such as methylol melamine methyl ether; n-butylated melamine resin curing agents such as methylol melamine butyl ether; methyl/n-butyl mixed etherified melamine resin curing agents; and the like.

The amount of the curing agent contained in the coating film is appropriately selected depending on an application of the coating material or the type of the resin. The coating material contains the curing agent described above preferably in an amount of 5 to 20 parts by mass and more preferably in an amount of 7 to 15 parts by mass relative to 100 parts by mass of the resin described above. When the amount of the curing agent is within the range described above, the curability of a coating film to be obtained from the coating is satisfactory.

(3) Other Components

The coating material may contain inorganic particles or organic particles. When the coating material contains them, it becomes easier to adjust the surface roughness of a coating film to be obtained or the like. Here, the average particle diameter of inorganic particles or organic particles is preferably 4 to 80 μm and more preferably 10 to 60 μm. The average particle diameter of inorganic particles or organic particles is a value measured by coulter counter method. Note that the shape of inorganic particles or organic particles is not particularly limited, but from the viewpoint where it is easy to adjust the surface condition of a coating film to be obtained, the shape is preferably generally spherical.

Examples of inorganic particles include silica, barium sulfate, talc, calcium carbonate, mica, glass beads and glass flakes. Examples of organic particles include resin beads composed of an acrylic resin or a polyacrylonitrile resin. Those resin beads may be produced using methods known in the art, or may be commercial products. Examples of commercially available acrylic resin beads include "TAFTIC AR650S (average particle diameter 18 μm)," "TAFTIC AR650M (average particle diameter 30 μm)," "TAFTIC AR650MX (average particle diameter 40 μm)," "TAFTIC AR650MZ (average particle diameter 60 μm)" and "TAFTIC AR650ML (average particle diameter 80 μm)," all of which are manufactured by TOYOBO CO., LTD. Examples of commercially available polyacrylonitrile resin beads include "TAFTIC A-20 (average particle diameter 24 μm)," "TAFTIC YK-30 (average particle diameter 33 μm)," "TAFTIC YK-50 (average particle diameter 50 μm)" and "TAFTIC YK-80 (average particle diameter 80 μm)," all of which are manufactured by TOYOBO CO., LTD.

The amount of inorganic particles and/or organic particles contained in the coating film is appropriately selected depending on a desired surface condition of the coating film or the like. Normally, the total amount of inorganic particles and/or organic particles may be 1 to 40 parts by mass relative to 100 parts by mass of the solid content of the coating material.

In addition, the coating material may further contain a coloring pigment as necessary. The average particle diameter of the coloring pigment may be, for example, 0.2 to 2.0 μm. Examples of the coloring pigment include titanium oxide, iron oxide, yellow oxide of iron, phthalocyanine blue, carbon black and cobalt blue. When the coating material contains a coloring pigment, the amount thereof is preferably 20 to 60 parts by mass and more preferably 30 to 55 parts by mass relative to 100 parts by mass of the solid content of the coating material.

In addition, the coating material may contain an organic solvent as necessary. The organic solvent is not particularly limited as long as it can sufficiently dissolve or disperse the above-described silicone resin or resin, curing agent, inorganic particles, organic particles and the like. Examples of the organic solvent include hydrocarbon solvents such as toluene, xylene, Solvesso® 100 (trade name; manufactured by ExxonMobil Chemical), Solvesso® 150 (trade name; manufactured by ExxonMobil Chemical) and Solvesso® 200 (trade name; manufactured by ExxonMobil Chemical); ketone solvents such as methyl ethyl ketone, methyl isobutyl ketone, cyclohexanone and isophorone; ester solvents such as ethyl acetate, butyl acetate and ethylene glycol monoethyl ether acetate; alcohol solvents such as methanol, isopropyl alcohol and n-butyl alcohol; ether alcohol solvents such as ethylene glycol monoethyl ether and diethylene glycol monobutyl ether; and the like. The coating material may include only one of these or two or more of them. Among them, xylene, Solvesso® 100, Solvesso® 150, cyclohexanone and n-butyl alcohol are preferred from the compatibility with the resin or the like.

(4) Method for Preparing Coating Material

A method for preparing the coating material is not particularly limited. The coating material may be prepared by mixing the above materials, followed by stirring or dispersing the same, in the same manner as coating materials known in the art. Note that the silicone resin may be premixed with other components. Alternatively, materials other than the silicone resin may be premixed and the silicone resin may be mixed in later.

2. Application of Coating Material

The above-mentioned coating material for a coated metal sheet is applied to a metal sheet. Here, for the metal sheet to which the coating material is applied, any metal sheets generally used as building boards may be used. Examples of such a metal sheet include plated steel sheets such as hot-dip Zn-55% Al alloy-plated steel sheets; steel sheets such as normal steel sheets and stainless-steel sheets; aluminum sheets; copper sheets; and the like. The metal sheet may have a chemical conversion film, an undercoat coating film or the like formed on its surface as long as it does not hinder the effects of the present invention. Furthermore, the metal sheet may be subjected to a processing for forming irregularities such as embossing and drawing as long as it does not impair the effects of the present invention.

The thickness of the metal sheet is not particularly limited, and is appropriately selected depending on an application of the coated metal sheet. For example, when the coated metal sheet is used for a metal siding material, the thickness of the metal sheet may be 0.15 to 0.5 mm.

A method for applying the above-mentioned coating material to the surface of the metal sheet is not particularly limited, and it may be appropriately selected from methods known in the art. Examples of the method for applying coating material include roll coating method, curtain flow method, spin coating method, air-spray method, airless-spray method and dip-and-draw up method. Among them, the roll coating method is preferred from the viewpoint where a coating film with a desired thickness is likely to be obtained efficiently.

In addition, a method for curing the coating material is appropriately selected depending on the type of a resin in the coating material and the like, and for example, it may be baking by heating. The temperature during the baking treatment is preferably 120 to 300° C., more preferably 150 to 280° C. and further preferably 180 to 260° C. from the viewpoint of preventing decomposition of the resin and the like in the coating material and obtaining a homogeneous coating film. The duration for the baking treatment is not particularly limited, and preferably 3 to 90 seconds, more preferably 10 to 70 seconds and further preferably 20 to 60 seconds from the same viewpoint as described above.

In addition, upon the baking of the coating material, wind may be blown such that the wind velocity on the sheet surface is 0.9 m/s or more in order to cure the coating material within a short time. In the coating material mentioned above, the silicone resin is bonded to other components via hydrogen bonding. Therefore, even if the coating material is cured while wind is blown, the silicone resin is unlikely to be evaporated and the heating apparatus is unlikely to be fouled.

Here, the thickness of the coating film formed on the metal sheet is appropriately selected depending on an application of the coated metal sheet and the like, but it is normally in the range of 3 to 30 μm. The thickness is a value determined through gravimetric method from the specific gravity of the baked coating film and the weight difference of the coated metal sheet before and after the removal of the coating film by sandblasting or the like. When the coating film is too thin, durability and concealing properties of the coating film may be insufficient. On the other hand, when the coating film is too thick, production costs are increased and popping may easily occur during the baking.

After forming the coating film described above, the coating material according to the present invention is subjected to a flame treatment to hydrophilize its surface. When the above-mentioned coating film of the coating material is subjected to a flame treatment, hydrocarbon groups (such as methyl groups or phenyl groups) of the silicone resin in the surface of the coating film are decomposed and silanol groups or siloxane bonds are produced. As a result of this, hydrophilicity of the surface of the coating film is enhanced and the rain-streak stain resistance is expressed.

The flame treatment may be, for example, a method in which a metal sheet having a coating film formed thereon is placed on a carrier such as a belt conveyor, and while the metal sheet is moved in a certain direction, flame is projected onto the coating film with a burner for flame treatment.

Here, the amount of flame treatment is preferably 30 to 1,000 kJ/m$^2$ and more preferably 100 to 600 kJ/m$^2$. Note that the "amount of flame treatment" in the present specification refers to the amount of heat per unit area of a coated metal sheet, which is calculated on the basis of the amount supplied of a combustion gas such as LP gas. The amount of flame treatment can be adjusted according to the distance between the burner head of the burner for flame treatment and the surface of the coating film, the conveying speed of the coating film, and the like. When the amount of flame treatment is less than 30 kJ/m$^2$, uneven treatment may occur and it is difficult to evenly hydrophilize the surface of the coating film. On the other hand, when the amount of flame treatment is greater than 1,000 kJ/m$^2$, the coating film may be oxidized and turn yellow.

Hereinafter, one example of a burner for flame treatment that can be used in the flame treatment of the coating film of the coating material of the present invention will be described; however, the flame treatment method is not limited thereto.

Figure 1B:
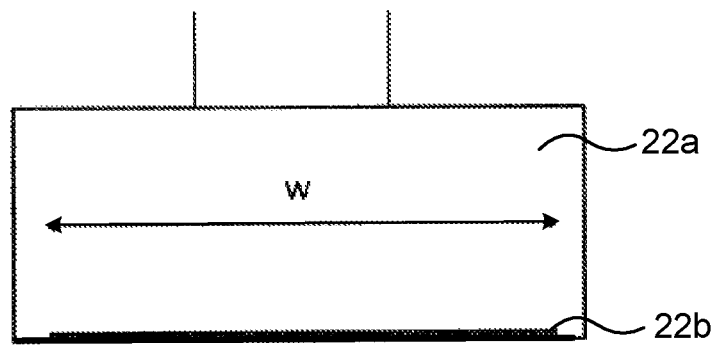
FIG. 1B is a front view of the burner head.
Figure 1C:
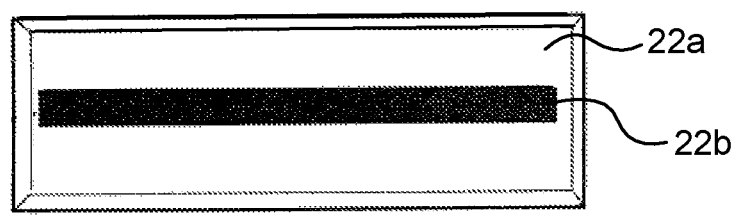
FIG. 1C is a bottom view of the burner head.

The burner for flame treatment has a gas supply pipe for supplying a combustible gas; a burner head for burning the combustible gas supplied from the gas supply pipe; and a support member for supporting them. FIGS. 1A, 1B and 1C schematically illustrate the burner head of the burner for flame treatment. FIG. 1A is a side view of the burner head, FIG. 1B is a front view of that burner head, and FIG. 1C is a bottom view of that burner head. For convenience sake, a part corresponding to burner port 22b is emphasized by illustrating with a thick line in FIGS. 1A and 1B; however, actually, burner port 22b cannot be seen from the side or the front.

Burner head 22 has housing 22a having the shape of a generally square pole, connected to gas supply pipe 23; and burner port 22b disposed on the underside of the housing. Burner head 22 burns combustible gas supplied from gas supply pipe 23 at burner port 22b.

The structure inside housing 22a of burner head 22 may be the same as the structure of a common burner for flame treatment, and may have, for example, a channel formed therein for allowing the combustible gas supplied from gas supply pipe 23 to flow toward burner port 22b. In addition, the width of housing 22a in a front view is appropriately selected depending on the width of a coating film to be subjected to the flame treatment. Moreover, the width of housing 22a in a side view is appropriately selected depending on the width of burner port 22b in the conveyance direction of the coating film (represented by L in FIG. 1A).

Meanwhile, burner port 22b is a through hole provided in the underside of housing 22a. The shape of burner port 22b is not particularly limited, and it may have any shape such as a rectangular or circular shape. However, from the viewpoint of carrying out the flame treatment uniformly in the width direction of the coating film, a rectangular shape is particularly preferred. In addition, the width of burner port 22b in the direction perpendicular to the conveyance direction of the coating film (represented by W in FIG. 1B) may be the same as or longer than the width of the coating film to be subjected to the flame treatment, and, for example, it may be about 50 to 150 cm. On the other hand, the width of burner port 22b in the conveyance direction of the coating film (represented by L in FIG. 1A) can be appropriately set depending on the discharge stability of the combustible gas or the like, and it may be about 1 to 8 mm.

Gas supply pipe 23 is a gas channel, one end of which is connected to burner head 22 and the other end of which is connected to a gas mixing section (not illustrated). The gas mixing section is connected to a combustion gas source (not illustrated) such as a combustion gas cylinder, and to a combustion-assisting gas source (not illustrated) such as an air cylinder, an oxygen cylinder, compressed air or air by a blower. The gas mixing section is a member for mixing the combustion gas and the combustion-assisting gas in advance. Note that the concentration of oxygen in the combustible gas (mixed gas of the combustion gas and the combustion-assisting gas) supplied from the gas mixing section to gas supply pipe 23 is preferably at a constant level, and the gas mixing section preferably has an oxygen feeder for supplying oxygen to gas supply pipe 23 as necessary.

Examples of the combustion gas described above include hydrogen, liquefied petroleum gas (LPG), liquefied natural gas (LNG), acetylene gas, propane gas and butane. Among them, from the viewpoint of easiness of forming a desired flame, LPG or LNG is preferred, and LPG is particularly preferred. On the other hand, examples of the combustion-assisting gas include air and oxygen, and the air is preferred due to the aspect of handleability.

The mixing ratio between the combustion gas and the combustion-assisting gas in the combustible gas supplied to burner head 22 via gas supply pipe 23 can be appropriately set depending on the types of the combustion gas and the combustion-assisting gas. For example, when the combustion gas is LPG and the combustion-assisting gas is air, the volume of the air is preferably 24 to 27, more preferably 25 to 26 and further preferably 25 to 25.5 relative to one volume of LPG. Alternatively, when the combustion gas is LNG and the combustion-assisting gas is air, the volume of the air is preferably 9.5 to 11, more preferably 9.8 to 10.5 and further preferably 10 to 10.2 relative to one volume of LNG.

In the burner for flame treatment, the flame treatment of a coating film is performed while the coating film is moved. The flame treatment described above can be carried out by, while discharging the combustible gas from burner port 22b of burner head 22 toward the coating film, burning the combustible gas. The distance between burner head 22 and the coating film is appropriately selected depending on the amount of flame treatment as mentioned above, but it may be normally about 10 to 120 mm, preferably 25 to 100 mm and more preferably 30 to 90 mm. When the distance between the burner head and the coating film is too small, the coating film may be brought into contact with the burner head due to a warp or the like of the metal sheet. On the other hand, when the distance between the burner head and the coating film is too large, a large amount of energy is required for the flame treatment. Note that, during the flame treatment, flame may be projected perpendicular to the surface of the coating film from the burner for flame treatment, but the flame may also be projected toward the surface of the coating film from the burner for flame treatment such that a certain angle is formed relative to the surface of the coating film.

In addition, the moving speed of the coating film is appropriately selected depending on the amount of flame treatment mentioned above, but normally, it is preferably 5 to 70 m/min, more preferably 10 to 50 m/min, and further preferably 20 to 40 m/min. By moving the coating film at a speed of 5 m/min or more, the flame treatment can be carried out efficiently. On the other hand, when the moving speed of the coating film is too fast, the movement of the coating film is likely to cause an air current to occur, thereby resulting in an insufficient flame treatment.

Figure 2A:
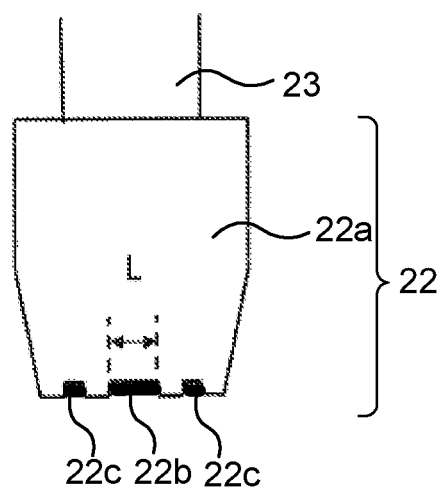
FIG. 2A is a side view of a burner head of another burner for flame treatment.
Figure 2B:
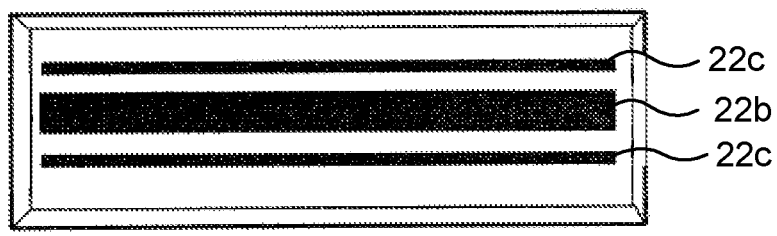
FIG. 2B is a bottom view of the burner head.

Note that, in the above description, burner head 22 has only one burner port 22b in housing 22a; however, the structure of burner head 22 is not limited thereto. For example, as illustrated in FIGS. 2A and 2B, burner head 22 may have auxiliary burner port 22c parallel to burner port 22b. FIG. 2A is a side view of such a burner head, and FIG. 2B is a bottom view of that burner head. For convenience sake, parts corresponding to burner port 22b and auxiliary burner port 22c are emphasized by illustrating with a thick line in FIG. 2A; however, actually, burner port 22b and auxiliary burner port 22c cannot be seen from the side or the front. Here, the spacing between burner port 22b and auxiliary burner port 22c is preferably 2 mm or more, and may be, for example, 2 mm to 7 mm. In this instance, housing 22a has a structure such that a very small amount of combustible gas passes through auxiliary burner port 22c. The amount of the combustible gas discharged from auxiliary burner port 22c is preferably 5% or less and more preferably 3% or less relative to the amount of the combustible gas discharged from burner port 22b. The flame generated at auxiliary burner port 22c exerts little influence on the surface treatment of the coating film, but the presence of auxiliary burner port 22c increases the rectilinearity of the combustible gas discharged from burner port 22b, thereby forming a steadier flame.

Moreover, prior to the flame treatment mentioned above, a preheating treatment for heating the surface of the coating film to 40° C. or higher may be carried out. When a flame is applied to a coating film formed on the surface of a metal sheet having a high thermal conductivity (for example, a metal sheet having a thermal conductivity of 10 W/mK or more), water vapor generated by the combustion of the combustible gas is cooled and becomes water, which temporarily stays on the surface of the coating film. Then, that water may absorb energy upon the flame treatment to become water vapor, thereby inhibiting the flame treatment. Responding to this, by heating the surface of the coating film (metal sheet) in advance, the generation of water upon the application of flame can be suppressed.

A method for preheating the coating film is not particularly limited, and a heating apparatus generally referred to as a drying oven may be used. For example, a batch-type drying oven (also referred to as a "safe-type oven") may be used. Specific examples thereof include a low temperature-thermostat manufactured by Isuzu Seisakusho Co., Ltd (Model: Mini-Katarina MRLV-11), an automatic ejection dryer manufactured by Tojo Netsugaku Co., Ltd (Model: ATO-101) and a simple dryer having an explosion-proof specification manufactured by Tojo Netsugaku Co., Ltd (Model: TNAT-1000).

As described above, according to the coating material of the present invention, the silicone resin can be enriched on the surface of the coating film without unevenness, and hydrophilicity of the coated metal sheet to be obtained can be enhanced uniformly. In addition, the coating material according to the present invention has high storage stability and furthermore, rarely fouls a heating apparatus. Therefore, according to the coating material of the present invention, a coated metal sheet that is applicable to exterior building materials for various buildings and the like and is less likely to suffer the occurrence of rain-streak stains can be produced efficiently.

EXAMPLES

Hereinafter, the present invention will be described in detail with reference to Examples; however, the present invention is not limited by these Examples.

1. Preparation of Coating Materials

Each coating material was prepared according to the following method.

1-1. Synthesis of Methyl-Based Silicone Resin 1

Into a 2-liter flask, 408 g (3.0 moles) of methyltrimethoxysilane was charged. Then, 800 g of water was added at 10° C. or lower and mixed well. Next, under ice cooling, 180 to 216 g (10.0 to 12.0 moles) of an aqueous 0.05 N hydrochloric acid solution was added dropwise at 5 to 25° C. over 20 to 40 minutes. After completion of the dropping, the mixture was stirred at 5 to 25° C. for 0.6 to 6 hours to complete hydrolysis and dehydrative condensation. As a result of this, prepared solutions containing seven methyl-based silicone resins A to G, each having a different content of silanol groups, were obtained. Note that the amount of silanol groups and the amount of structural units of methyl-based silicone resins A to G were adjusted through the above-described reaction time (stirring time) and reaction temperature, as well as the amount added of the aqueous hydrochloric acid solution.

Subsequently, from that prepared solution, methanol produced by the hydrolysis was distilled off under reduced pressure at 70° C. and 60 mmHg for 1 hour. The prepared solution after the distillation of methanol was clouded, and after leaving it at rest overnight, it was separated into 2 layers. The lower layer was a precipitated silicone resin that was insoluble in water. To that prepared solution, 469 g of methyl isobutyl ketone (MIBK) was added and the mixture was stirred at room temperature for 1 hour. As a result of this, the precipitated silicone resin was completely dissolved in MIBK. Then, the prepared solution was left at rest to be separated into the aqueous layer and the MIBK layer. Subsequently, the aqueous layer, which was the lower layer, was removed using a flask equipped with a cock to obtain a colorless and transparent silicone resin solution having a solid content of 50 mass %.

When the structure of obtained methyl-based silicone resin A was measured with $^{29}$Si-NMR, two broad signals were observed. Their chemical shifts were as follows: (1) δ=−54 to −58 ppm and (2) δ=−62 to −68 ppm. These chemical shifts are attributed to silicon atoms of $T_m$-2 unit and $T_m$-3 unit among $T_m$ units represented by the following formulas, respectively. That is, $T_m$-1 unit was not contained in methyl-based silicone resin A. In addition, when $^1$H-NMR analysis was carried out on methyl-based silicone resin A, it was found that all methoxy groups derived from methyltrimethoxysilane were hydrolyzed to become hydroxy groups.

[Formula 4]

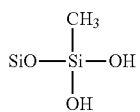
($T_m$-1 unit)

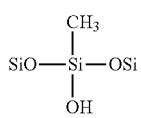
($T_m$-2 unit)

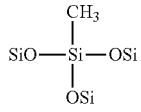
($T_m$-3 unit)

Furthermore, GPC analysis (in terms of polystyrene) was carried out under the following conditions to measure the weight average molecular weight Mw and the molecular weight distribution Mw/Mn of silicone resin A.

Measuring model: HLC-8320GPC manufactured by TOSOH CORPORATION
Columns: Shodex K-G+K-805L×2+K-800D
Eluent: chloroform
Temperature: column thermostat 40.0° C.
Flow rate: 1.0 mL/min
Concentration: 0.2 mass/volume %
Injection volume: 100 µl
Solubility: complete dissolution
Pretreatment: filtration with a 0.45 µm filter
Detector: differential refractometer (RI)

Similarly, for each of methyl-based silicones B to G, the structure was specified with $^{29}$Si-NMR and analyses. In addition, the weight average molecular weight Mw and the molecular weight distribution Mw/Mn were measured with GPC analysis. Results of analysis for methyl-based silicones A to G are shown in Table 1 below.

1-2. Synthesis of Methyl-Based Silicone Resin 2

Into a 2-liter flask, 286 to 163 g (2.1 to 1.2 moles) of methyltrimethoxysilane and 108 to 216 g (0.9 to 1.8 moles) of dimethyldimethoxysilane were charged. Then, 800 g of water was added at 10° C. or lower and mixed well. Next, under ice cooing, 180 to 216 g (10.0 to 12.0 moles) of an aqueous 0.05 N hydrochloric acid solution was added dropwise at 5 to 25° C. over 20 to 40 minutes. After completion of the dropping, the mixture was stirred at 5 to 25° C. for 0.6 to 6 hours to carry out hydrolysis and dehydrative condensation. After completion of the dropping, the same operations were carried out as Synthesis of Methyl-Based Silicone Resin 1 to obtain silicone resin solutions containing three methyl-based silicone resins H to J having a solid content of about 50 mass %. Note that the amount of silanol groups and the amount of structural units of methyl-based silicone resins H to J were adjusted through the above-described reaction time (stirring time), reaction temperature, the amount added of the aqueous hydrochloric acid solution and the amount charged.

For each of obtained methyl-based silicones H to J, the structure was specified with $^{29}$Si-NMR and $^1$H-NMR analyses. Furthermore, the weight average molecular weight Mw and the molecular weight distribution Mw/Mn were measured with GPC analysis. Results of analysis for methyl-based silicones H to J are shown in Table 2 below. Note that $D_m$-1 unit and $D_m$-2 unit in Table 2 are structural units represented by the following formulas, respectively.

[Formula 5]

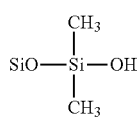
($D_m$-1 unit)

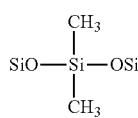
($D_m$-2 unit)

TABLE 1

| Silicone resin | Weight average molecular weight | Molecular weight distribution (Mw/Mn) | T units/ D units | $T_m$ units | | | Amount of silanol groups relative to amount of Si atoms (mol %) |
| | | | | $T_m$ − 1 unit (mol %) | $T_m$ − 2 unit (mol %) | $T_m$ − 3 unit (mol %) | |
|---|---|---|---|---|---|---|---|
| A | 48000 | 7.2 | 100/0 | 0 | 8 | 92 | 8 |
| B | 2600 | 2.4 | 100/0 | 0 | 29 | 71 | 29 |
| C | 1400 | 1.7 | 100/0 | 0 | 38 | 62 | 38 |
| D | 790 | 1.4 | 100/0 | 0 | 48 | 52 | 48 |
| E | 51000 | 11.8 | 100/0 | 0 | 4 | 96 | 4 |
| F | 1300 | 1.3 | 100/0 | 0 | 52 | 48 | 52 |
| G | 680 | 1.1 | 100/0 | 0 | 24 | 76 | 24 |

TABLE 2

| Silicone resin | Weight average molecular weight | Molecular weight distribution (Mw/Mn) | T units/ D units | $T_m$ units | | | $D_m$ units | | Amount of silanol groups relative to amount of Si atoms (mol %) |
| --- | --- | --- | --- | --- | --- | --- | --- | --- | --- |
| | | | | $T_m-1$ unit (mol %) | $T_m-2$ unit (mol %) | $T_m-3$ unit (mol %) | $D_m-1$ unit (mol %) | $D_m-1$ unit (mol %) | |
| H | 2900 | 2.7 | 71/29 | 0 | 21 | 50 | 4 | 25 | 25 |
| I | 2400 | 1.9 | 55/45 | 0 | 19 | 36 | 9 | 36 | 28 |
| J | 2100 | 2.0 | 40/60 | 0 | 14 | 26 | 13 | 47 | 27 |

1-3. Synthesis of Methyl/Phenyl-Based Silicone Resin 3

Into a 2-liter flask, 326 to 41 g (2.4 to 0.3 moles) of methyltrimethoxysilane and 119 to 535 g (0.6 to 2.7 moles) of phenyltrimethoxysilane were charged. Then, 800 g of water was added at 10° C. or lower and mixed well. Next, under ice cooing, 180 to 216 g (10.0 to 12.0 moles) of an aqueous 0.05 N hydrochloric acid solution was added dropwise at 5 to 25° C. over 20 to 40 minutes. After completion of the dropping, the mixture was stirred at 5 to 25° C. for 0.6 to 6 hours to complete hydrolysis and dehydrative condensation. After completion of the dropping, the same operations were carried out as Synthesis of Methyl-Based Silicone Resin 1 to obtain prepared solutions containing five methyl/phenyl-based silicone resins K to O having a solid content of about 50 mass %. Note that the amount of silanol groups and the amount of structural units of methyl/phenyl-based silicone resins K to O were adjusted through the above-described reaction time (stirring time), reaction temperature, the amount added of the aqueous hydrochloric acid solution and the amount charged.

For each of obtained methyl-based silicones K to O, the structure was specified with $^{29}$Si-NMR and $^1$H-NMR analyses. Note that, when the structure of methyl/phenyl-based silicone resin L was measured with $^{29}$Si-NMR, four broad signals were observed. Their chemical shifts were as follows: (1) δ=−52 to −61 ppm, (2) δ=−62 to −71 ppm, (3) δ=−67 to −75 ppm and (4) δ=−75 to −83 ppm. These chemicals shifts are attributed to silicon atoms of $T_m$-2 unit, $T_m$-3 unit, $T_f$-2 unit and $T_f$-3 unit among $T_m$ units and $T_f$ units represented by the following formulas, respectively. In addition, when $^1$H-NMR analysis was carried out on methyl/phenyl-based silicone resin L, it was found that all methoxy groups derived from methyltrimethoxysilane and phenyltrimethoxysilane were hydrolyzed to become hydroxy groups. Furthermore, the weight average molecular weight Mw and the molecular weight distribution Mw/Mn were measured with GPC analysis. Results of analysis are shown in Table 3.

[Formula 6]

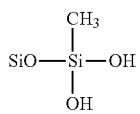

($T_m$-1 unit)

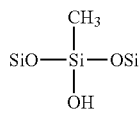

($T_m$-2 unit)

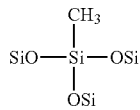

($T_m$-3 unit)

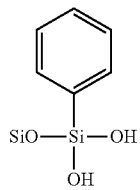

($T_f$-1 unit)

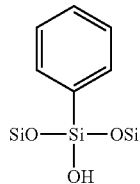

($T_f$-2 unit)

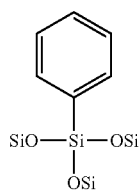

($T_f$-3 unit)

TABLE 3

| Silicone resin | Weight average molecular weight | Molecular weight distribution (Mw/Mn) | T units/ D units | Methyl/ phenyl | $T_m$ units | | | $T_f$ units | | | Amount of silanol groups relative to amount of Si atoms (mol %) |
| --- | --- | --- | --- | --- | --- | --- | --- | --- | --- | --- | --- |
| | | | | | $T_m-1$ unit (mol %) | $T_m-2$ unit (mol %) | $T_m-3$ unit (mol %) | $T_f-1$ unit (mol %) | $T_f-2$ unit (mol %) | $T_f-3$ unit (mol %) | |
| K | 2600 | 2.4 | 100/0 | 80/20 | 0 | 20 | 60 | 0 | 5 | 15 | 25 |
| L | 3100 | 2.9 | 100/0 | 66/34 | 0 | 18 | 48 | 0 | 9 | 25 | 27 |
| M | 2400 | 2.1 | 100/0 | 50/50 | 0 | 15 | 35 | 0 | 16 | 34 | 31 |
| N | 2600 | 1.8 | 100/0 | 20/80 | 0 | 5 | 15 | 0 | 21 | 59 | 26 |
| O | 3200 | 2.9 | 100/0 | 10/90 | 0 | 3 | 7 | 0 | 29 | 61 | 32 |

1-4. Synthesis of Methyl/Phenyl-Based Silicone Resin 4

Into a 2-liter flask, 109 to 27 g (0.8 to 0.2 moles) of methyltrimethoxysilane, 198 g (1.0 mole) of phenyltrimethoxysilane and 144 to 216 g (1.2 to 1.8 moles) of dimethyldimethoxysilane were charged. Then, 800 g of water was added at 10° C. or lower and mixed well. Next, under ice cooing, 180 to 216 g (10.0 to 12.0 moles) of an aqueous 0.05 N hydrochloric acid solution was added dropwise at 5 to 25° C. over 20 to 40 minutes, and the mixture was stirred at 5 to 25° C. for 0.6 to 6 hours to complete hydrolysis and dehydrative condensation. After completion of the dropping, the same operations were carried out as Synthesis of Methyl-Based Silicone Resin 1 to obtain silicone resin solutions containing three methyl/phenyl-based silicone resins P to R having a solid content of about 50 mass %. Note that the amount of silanol groups and the amount of structural units of methyl/phenyl-based silicone resins P to R were adjusted through the above-described reaction time (stirring time), reaction temperature, the amount added of the aqueous hydrochloric acid solution and the amount charged.

For each of obtained methyl-based silicones P to R, the structure was specified with $^{29}$Si-NMR and $^{1}$H-NMR analyses. Furthermore, the weight average molecular weight Mw and the molecular weight distribution Mw/Mn were measured with GPC analysis. Results of analysis are shown in Table 4.

[Ethyl Silicate T]

Ethyl silicate 48 (manufactured by Colcoat Co., Ltd., condensate of tetraethoxysilane) weight average molecular weight (Mw): 1,300, number average molecular weight (Mn): 850, Mw/Mn=1.5

1-6. Preparation of Coating Materials

By mixing a polymer polyester resin having a number average molecular weight of 5,000, a glass transition temperature of 30° C. and a hydroxy value of 28 mgKOH/g (manufactured by DIC Corporation) and a methylated melamine resin curing agent having 90 mol % of methoxy groups (CYMEL® 303, manufactured by Mitsui Cytec Co., Ltd.), a composition including a polyester resin that serves as a base and a melamine resin curing agent was obtained. The blend ratio of the polyester resin and the methylated melamine resin curing agent was 70/30.

To the composition described above, 1 mass % of dodecylbenzenesulfonic acid was added as a catalyst, relative to the solid content of the composition described above. Furthermore, dimethylaminoethanol was added. Note that the amount added of dimethylaminoethanol was such that the amine equivalent thereof is 1.25 times the acid equivalent of dodecylbenzenesulfonic acid.

Furthermore, as shown in Table 5, each of the above-mentioned methyl-based silicone resins, methyl/phenyl-based silicone resins, methyl silicate or ethyl silicate was added such that the amount thereof is 5 mass % relative to the total solid content of the coating material. In addition, for the coating material to which methyl silicate or ethyl silicate was added, triethyl orthoformate was added such that the

TABLE 4

| Silicone resin | Weight average molecular weight | Molecular weight distribution (Mw/Mn) | T units/ D units | Methyl/ phenyl | $T_m$ units | | | $T_f$ units | | | D units | | Amount of silanol groups relative to amount of Si atoms (mol %) |
| --- | --- | --- | --- | --- | --- | --- | --- | --- | --- | --- | --- | --- | --- |
| | | | | | $T_m-1$ unit (mol %) | $T_m-2$ unit (mol %) | $T_m-3$ unit (mol %) | $T_f-1$ unit (mol %) | $T_f-2$ unit (mol %) | $T_f-3$ unit (mol %) | $D_m-1$ unit (mol %) | $D_m-2$ unit (mol %) | |
| P | 4200 | 3.1 | 60/40 | 66/34 | 0 | 11 | 15 | 0 | 14 | 20 | 0 | 40 | 25 |
| Q | 3900 | 3.1 | 50/50 | 66/34 | 0 | 8 | 8 | 0 | 18 | 16 | 0 | 50 | 28 |
| R | 3300 | 2.7 | 40/60 | 66/34 | 0 | 3 | 3 | 0 | 21 | 13 | 0 | 60 | 28 |

1-5. Arrangement of Methyl Silicate and Ethyl Silicate

For methyl silicate and ethyl silicate, the following commercial products were used.

[Methyl Silicate S]

Methyl silicate 53A (manufactured by Colcoat Co., Ltd., condensate of tetramethoxysilane) weight average molecular weight (Mw): 840, number average molecular weight (Mn): 610, Mw/Mn=1.4 amount thereof is 5 mass % relative to the total solid content of the coating material.

2. Evaluation

Using the above-described coating material, a coated metal sheet was made as follows.

2-1. Arrangement of Metal Sheet

An A4-sized (210 mm×297 mm) hot-dip Zn-55% Al alloy-plated steel sheet having a sheet thickness of 0.27 mm and a per-side plating deposition amount of 90 g/m² was arranged as a metal sheet, and the surface thereof was alkali-degreased. Subsequently, an application-type chromate treatment liquid (NRC300NS, manufactured by Nippon Paint Co., Ltd.) was applied on the surface of the metal sheet such that the Cr deposition amount was 50 mg/m². Furthermore, an epoxy resin-based primer coating material (700P, manufactured by Nippon Fine Coatings Inc.) was applied using a roll coater such that the thickness of the cured film was 5 μm. Subsequently, the resultant sheet was baked such that the highest temperature that the base sheet reached was 215° C., thereby obtaining a plated steel sheet having a primer coating film formed thereon (hereinafter, also simply referred to as a "plated steel sheet").

2-2. Application of Coating Material

The coating material prepared as mentioned above was applied to the above-mentioned plated steel sheet using a roll coater such that the thickness of the cured film was 18 μm, and was baked for 45 seconds such that the highest temperature that the sheet reached was 225° C. and the wind velocity on the sheet surface was 0.9 m/s.

2-3. Flame Treatment

The coating film of the coating material described above was subjected to a flame treatment. As a burner for flame treatment, F-3000 manufactured by Flynn Burner Corporation (USA) was used. As a combustible gas, a mixed gas obtained by mixing LP gas (combustion gas) and clean dry air (LP gas:clean dry air (volume ratio)=1:25) using a gas mixer was used. In addition, the flow rate of each gas was adjusted such that, for 1 cm² of a burner port of the burner, the flow rate of the LP gas (combustion gas) was 1.67 L/min and the flow rate of the clean dry air was 41.7 L/min. The length (a length represented by L in FIG. 1A) of the burner port of the burner head in the conveyance direction of a coating film was set to be 4 mm. The length (a length represented by W in FIG. 1B) of the burner port of the burner head in the direction perpendicular to the conveyance direction was set to be 450 mm. Furthermore, the distance between the burner port of the burner head and the surface of the coating film was set to be 50 mm depending on an amount desired of flame treatment. Moreover, the conveyance speed of the coating film was set to be 30 m/min, thereby adjusting the amount of flame treatment to be 212 kJ/m².

2-4. Tests

For coating materials prepared in Examples and Comparative Examples, and coated metal sheets made by using those coating materials, the following tests were carried out. Results are shown in Table 5.

(1) Amount of Silicone Resin or Silicate Evaporated

By applying each of the coating materials of Examples and Comparative Examples to the surface of an aluminum sheet (JIS A5052) having a thickness of 0.5 mm such that the film thickness was 18 μm, a coating film was formed. Then, the coated aluminum sheet having the coating film formed thereon was cut into a 10 cm×10 cm square, which was dissolved in a mixed acid solution of hydrofluoric acid, hydrochloric acid and nitric acid, and was further thermolyzed by irradiating it with microwave. Subsequently, by diluting the solution with ultrapure water to a certain volume, a test liquid was prepared. Using an ICP-AES analyzing apparatus (ICPE-9820 model) manufactured by Shimadzu Corporation, Si in that test liquid was analyzed quantitatively.

Meanwhile, a coating material was prepared in the same manner as Examples and Comparative Examples except that the silicone resin or silicate was not added, and that coating material was used to form a coating film. Then, as described above, Si in the test liquid was analyzed quantitatively.

By comparing these results, the amount of Si derived from a silicone resin or silicate in the coating film obtained from each coating material made in Examples and Comparative Examples was determined. In addition, the amount of Si in the coating film was determined by calculation in the case where a silicone resin or silicate was not evaporated at all. Then, by comparing the amount of Si in the case where no evaporation occurred and the amount of Si in each of the coating films that can be obtained from the coating material made in Examples or Comparative Examples, the amount of a silicone resin or silicate evaporated upon formation of the coating film was evaluated on the basis of the following criteria.

D: amount evaporated of 20% or more
C: 10% or more and less than 20%
B: 3% or more and less than 10%
A: less than 3%

Note that C, B and A were evaluated as passing.

(2) Evaluation on Storage Stability of Coating Materials

Each coating materials used in Examples and Comparative Examples were stored in a thermostatic chamber at 40° C., and the viscosity of each coating material after 15 days was measured with a B-type viscometer. Then, by comparing viscosities before and after the storage, evaluation was carried out on the basis of the following criteria.

D: gelated in 15 days after being left in thermostatic chamber
C: rising rate of coating material viscosity is 100% or more before and after storage in thermostatic chamber
B: rising rate of coating material viscosity is 30% or more and less than 100% before and after storage in thermostatic chamber
A: rising rate of coating material viscosity is less than 30% before and after storage in thermostatic chamber Note that C, B and A were evaluated as passing.

(3) Method for Evaluating Pencil Hardness

In accordance with JIS K5600-5-4 (ISO/DIS 15184), a pencil hardness test was carried out for evaluating scratch resistance of the surface of a coating film. Scratch resistance of the surface of the coating film was evaluated on the basis of the following criteria.

A: H or harder
B: B to HB
C: 2B or softer

Note that A and B were evaluated as passing.

(4) Measurement of Water Contact Angle

The water contact angle was measured for the surface of the coating film of the coated metal sheet made by using the coating material prepared in each of Examples and Comparative Examples. The measurement was carried out by forming a 0.01 cc droplet of purified water in a thermostat and humidistat chamber at an atmospheric temperature of 23±2° C. and a relative humidity of 50±5%, and using a contact angle measuring device DM901 manufactured by Kyowa Interface Science, Inc.

(5) Evaluation of Rain-Streak Stain Resistance

The rain-streak stain resistance was evaluated as follows.

Each of the coated metal sheets made by using the coating material prepared in Examples and Comparative Examples was attached to a vertical exposure board. Above the coated metal sheet, a corrugated sheet was further attached at an angle of 20° relative to the ground. Upon this, the corrugated sheet was installed such that rainwater ran down the surface of the coated metal sheet as streaks. In this state, an outdoor exposure test was carried out for 6 months, and the state of stain adhesion was then observed. The rain-streak stain resistance was evaluated using brightness difference (ΔL) of the coated metal sheet before and after the exposure as follows.

D: ΔL was 2 or more (stains were noticeable)
C: ΔL was 1 or more and less than 2 (rain-streak stains were not noticeable, but visible)
B: ΔL was less than 1 (rain-streak stains were hardly visible)
A: ΔL was less than 1 and no rain-streak stain was visible
Note that C, B and A were evaluated as passing.

groups is less than 5 mol % relative to the amount (number of moles) of Si atoms, storage stability of the coating material was low, and the rain-streak stain resistance was not sufficient, either (Comparative Example 1). When the amount of silanol groups is less than 5 mol %, the molecular weight of the silicone resin tends to become larger, and the silicone resin was polymerized considerably through some degree of reaction during the storage. It is assumed that the storage stability was lowered due to this. In addition, when the molecular weight of the silicone resin becomes larger, the silicone resin is unlikely to be enriched uniformly on the

TABLE 5

| No. | | Type of hydro-philizing agent | Sym-bol | Methyl/ phenyl ratio | T units/ D units ratio | Amount of silanol groups relative to amount of Si atoms (mol %) | Molecular weight Mw | Mw/Mn | Evalu-ation of evap-orating properties | Surface treat-ment method | Storage stability of coating material | Pencil hard-ness | Water contact angle (°) | Evalu-ation of rain-streak stain resistance |
|---|---|---|---|---|---|---|---|---|---|---|---|---|---|---|
| Exam-ples | 1 | Methyl-based Silicone resin | A | 100/0 | 100/0 | 8 | 48,000 | 7.2 | A | Flame | C | A | 59 | C |
| | 2 | | B | 100/0 | 100/0 | 29 | 2,600 | 2.4 | A | Flame | B | A | 24 | A |
| | 3 | | C | 100/0 | 100/0 | 38 | 1,400 | 1.7 | B | Flame | B | A | 23 | A |
| | 4 | | D | 100/0 | 100/0 | 48 | 790 | 1.4 | B | Flame | C | A | 39 | B |
| | 5 | | G | 100/0 | 100/0 | 24 | 680 | 1.1 | C | Flame | B | A | 22 | A |
| | 6 | | H | 100/0 | 71/29 | 25 | 2,900 | 2.7 | A | Flame | B | A | 29 | A |
| | 7 | | I | 100/0 | 55/45 | 28 | 2,400 | 1.9 | A | Flame | B | A | 35 | B |
| | 8 | | J | 100/0 | 40/60 | 27 | 2,100 | 2.0 | A | Flame | B | A | 48 | C |
| | 9 | Methyl/ phenyl-based Silicone resin | K | 80/20 | 100/0 | 25 | 2,600 | 2.4 | A | Flame | A | A | 22 | A |
| | 10 | | L | 66/34 | 100/0 | 27 | 3,100 | 2.9 | A | Flame | A | A | 24 | A |
| | 11 | | M | 50/50 | 100/0 | 31 | 2,400 | 2.1 | A | Flame | A | A | 26 | A |
| | 12 | | N | 20/80 | 100/0 | 26 | 2,600 | 1.8 | A | Flame | A | A | 25 | A |
| | 13 | | O | 10/90 | 100/0 | 32 | 3,200 | 2.9 | A | Flame | A | B | 27 | A |
| | 14 | | P | 66/34 | 60/40 | 25 | 4,200 | 3.1 | A | Flame | A | A | 29 | A |
| | 15 | | Q | 66/34 | 50/50 | 28 | 3,900 | 3.1 | A | Flame | A | A | 37 | B |
| | 16 | | R | 66/34 | 40/60 | 28 | 3,300 | 2.7 | A | Flame | A | B | 49 | C |
| Compar-ative Exam-ples | 1 | Methyl-based silicone resin | E | 100/0 | 100/0 | 4 | 51,000 | 11.8 | A | Flame | D | A | 64 | D |
| | 2 | | F | 100/0 | 100/0 | 52 | 1,300 | 1.3 | B | Flame | D | A | 51 | C |
| | 3 | Methyl silicate | S | — | — | — | 840 | 1.4 | D | Flame | D | B | 70 | D |
| | 4 | Ethyl silicate | T | — | — | — | 1,300 | 1.5 | D | Flame | D | A | 44 | B |

As shown in above-described Table 5, in the case of a coating material containing a silicone resin in which the amount (number of moles) of silanol groups is 5 to 50 mol % relative to the amount (number of moles) of Si atoms, the storage stability was satisfactory and the coating material was unlikely to be evaporated upon heating and drying the film (Examples 1 to 16). Furthermore, coated metal sheets obtained by application of these coating materials and the flame treatment had high rain-streak satin resistance and also had high scratch resistance.

In contrast, for coating materials containing organosilicate such as methyl silicate or ethyl silicate, the storage stability was not sufficient and the coating materials were likely to be evaporated upon curing coating films (Comparative Examples 3 and 4). Furthermore, in coated metal sheets made by using a coating material containing methyl silicate, the scratch resistance was low, and the rain-streak stain resistance was also low (Comparative Example 3). It is assumed that, in that coating material, methyl silicate was not likely to be enriched on the surface of the film upon the application, and methyl silicate was evaporated as well upon curing the film.

In addition, even when a coating material contains a silicone resin, if the amount (number of moles) of silanol surface and is likely to be in the form of sea-island. It is assumed that rain-streak stains were not suppressed sufficiently due to this.

On the other hand, when the amount (number of moles) of silanol groups is greater than 50 mol % relative to the amount (number of moles) of Si atoms, storage stability of the coating material was low (Comparative Example 2). When the amount of silanol groups is greater than 50 mol %, the reactivity of the silicone resin is increased. It is assumed that the storage stability of the coating material was lowered due to this. In addition, since the amount of silanol groups is large, the silicone resin tends to be micellized, and the silicone resin was likely to be in the form of sea-island. It is assumed that the rain-streak stain resistance was apt to be decreased due to this.

The present application claims priority based on Japanese Patent Application No. 2017-65925 filed on Mar. 29, 2017, the entire contents of which including the specification and the accompanying drawings are incorporated herein by reference.

INDUSTRIAL APPLICABILITY

The coating material according to the present invention has high storage stability and furthermore, rarely fouls a heating apparatus upon formation of a coating film. Furthermore, according to that coating material, it is possible to obtain a coated metal sheet in which rain-streak stains are unlikely to occur and the scratch resistance is high. Therefore, that coated metal sheet is applicable to exterior building materials for various buildings.

REFERENCE SIGNS LIST

22 Burner head
22a Housing
22b Burner port
22c Auxiliary burner port
23 Gas supply pipe

The invention claimed is:

1. A coated metal sheet obtained by a process comprising the steps of:
    applying a compound to a surface of a metal sheet to form a coating film, the compound comprising:
        a silicone resin containing silanol groups in an amount of 5 to 50 mol % relative to the total number of moles of Si atoms;
        a binder resin comprising a polyester resin or an acrylic resin not having a silyl group; and
        an organic solvent;
        wherein the silicone resin and the binder resin are each dissolved or dispersed in the organic solvent; and
        the silicone resin contains Si atoms derived from trialkoxysilane in an amount of 50 to 100 mol % relative to the total number of moles of Si atoms; and
    subjecting a surface of the coating film to a hydrophilization treatment through a flame treatment.

2. The coating material for a coated metal sheet according to claim 1, wherein a proportion of a number of moles of aryl groups directly bonded to Si atoms based on a number of moles of alkyl groups directly bonded to Si atoms is 20 to 80% in the silicone resin.

* * * * *